INVENTORS:
WARREN H. AMSTER
CLARENCE H. HOLLEMAN
EUGENE V. BROWNE

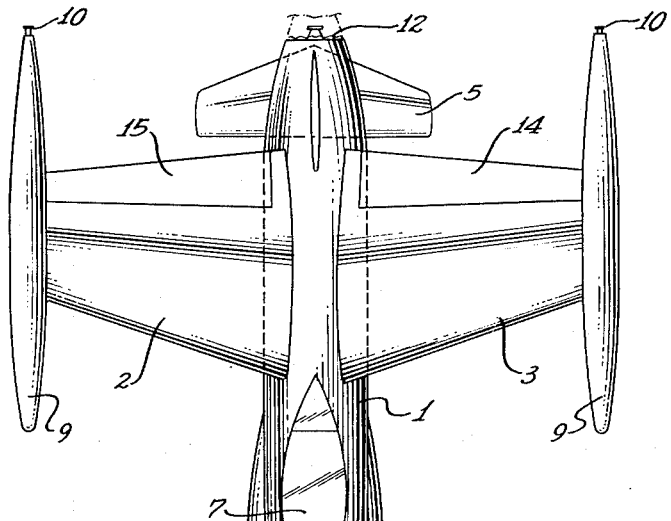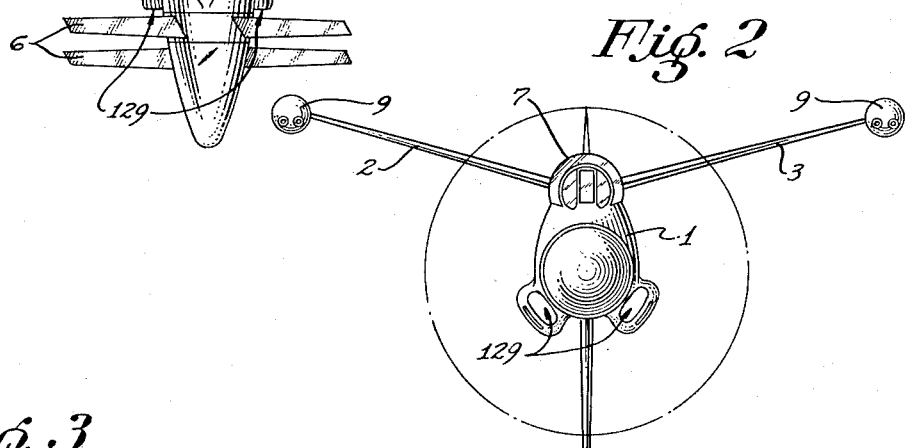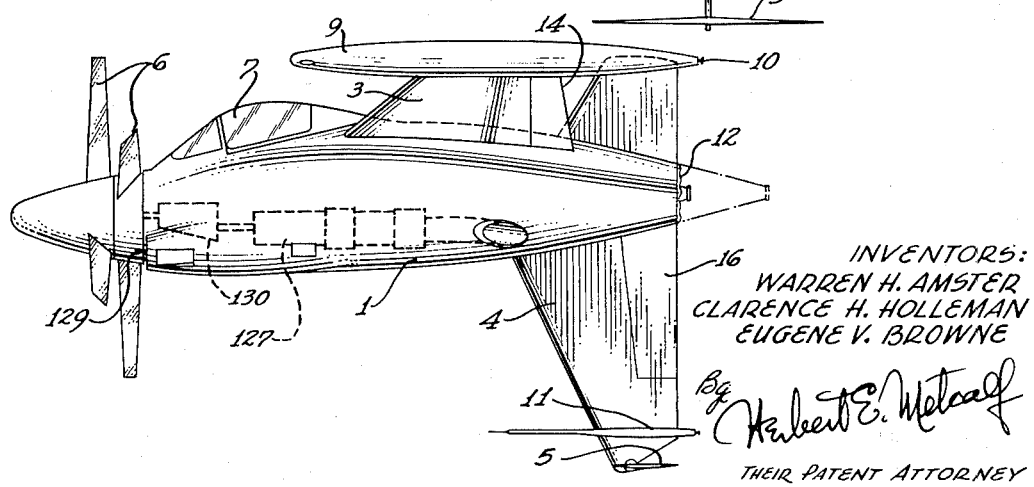

By Herbert E. Metcalf
THEIR PATENT ATTORNEY

July 5, 1955 W. H. AMSTER ET AL 2,712,420
VERTICAL TAKE-OFF AIRPLANE AND CONTROL SYSTEM THEREFOR
Filed Dec. 1, 1951 9 Sheets-Sheet 4
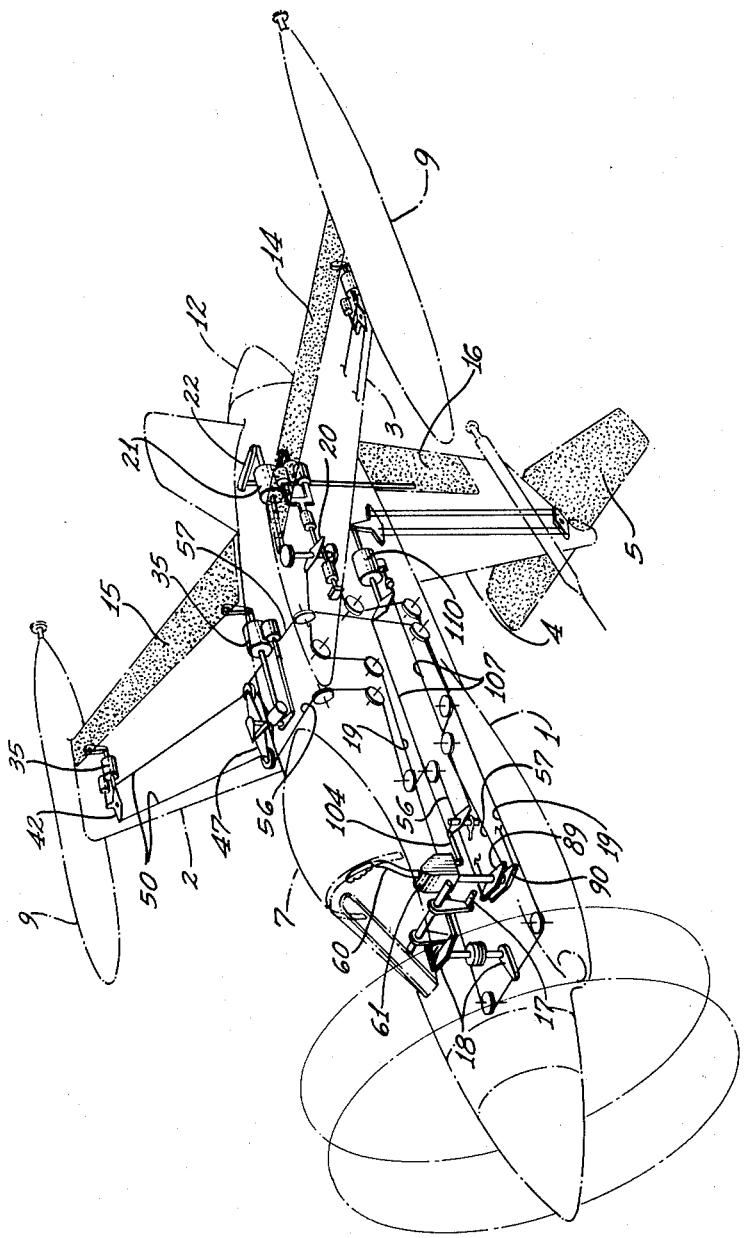
Fig. 7
INVENTORS:
WARREN H. AMSTER
CLARENCE H. HOLLEMAN
EUGENE V. BROWNE
THEIR PATENT ATTORNEY

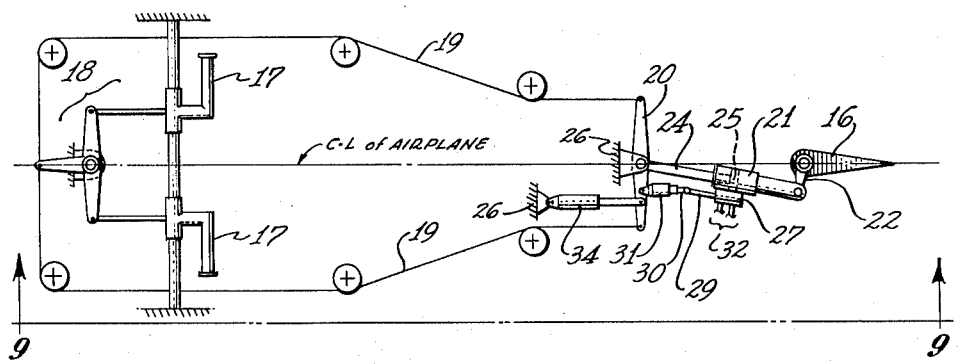
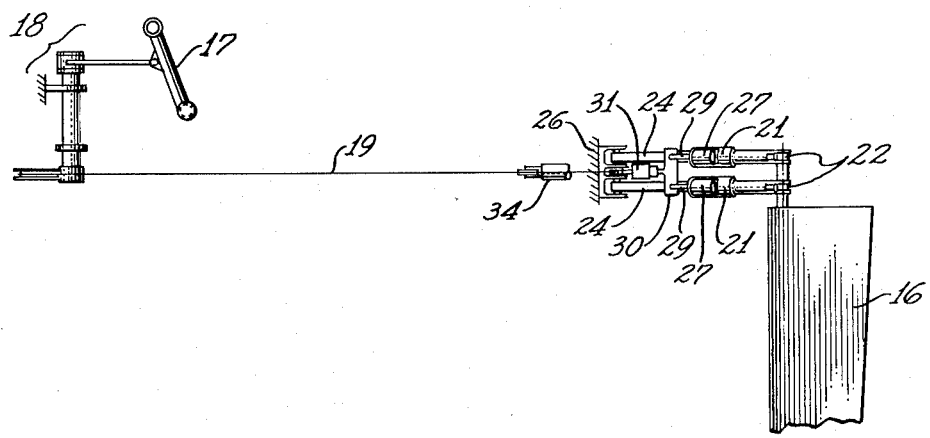

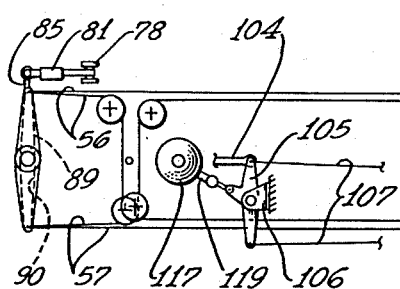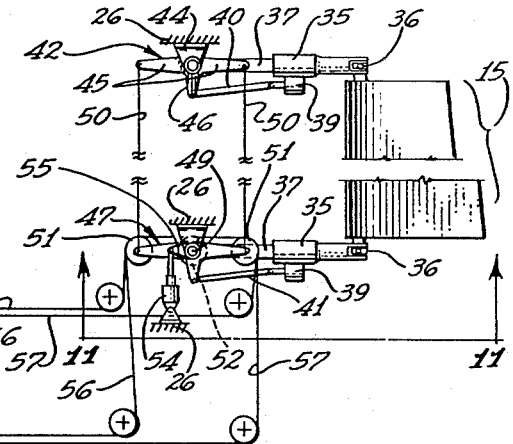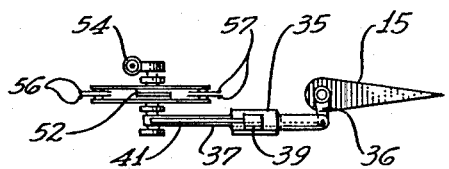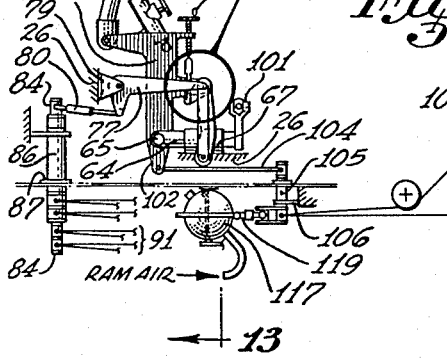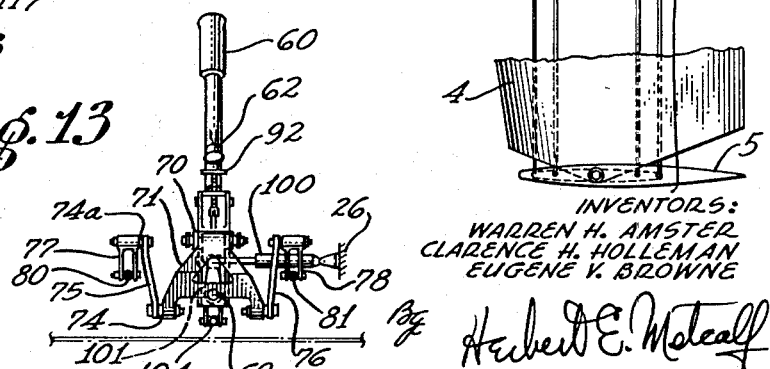

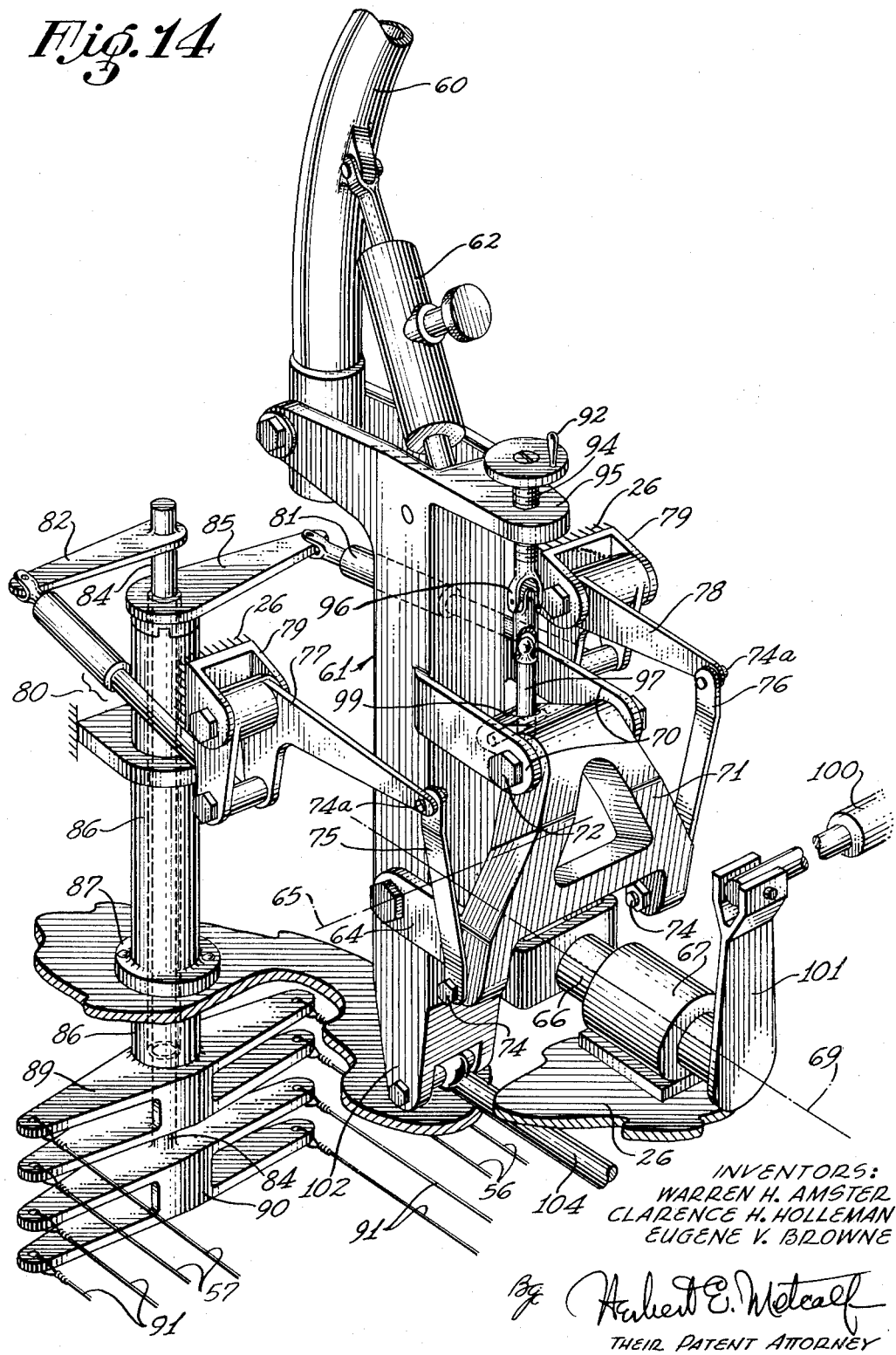

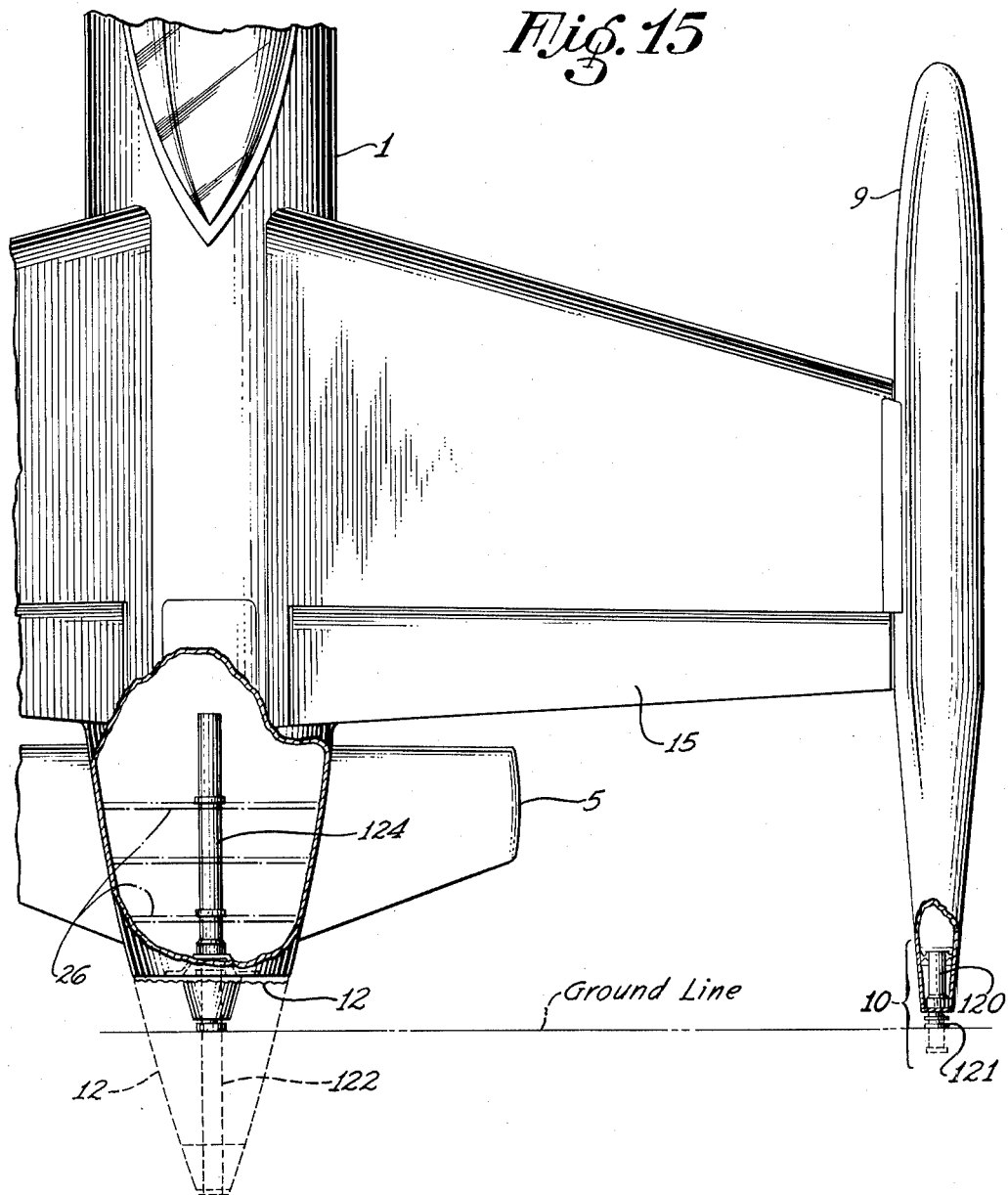

July 5, 1955   W. H. AMSTER ET AL   2,712,420
VERTICAL TAKE-OFF AIRPLANE AND CONTROL SYSTEM THEREFOR
Filed Dec. 1, 1951   9 Sheets-Sheet 9

TAKE-OFF &
HOVERING
POSITION

NORMAL FLIGHT
& EJECTION POSITION

INVENTORS:
WARREN H. AMSTER
CLARENCE H. HOLLEMAN
EUGENE V. BROWNE

By Herbert E. Metcalf
THEIR PATENT ATTORNEY

United States Patent Office 2,712,420
Patented July 5, 1955

2,712,420

VERTICAL TAKE-OFF AIRPLANE AND CONTROL SYSTEM THEREFOR

Warren H. Amster, Montclair, N. J., and Clarence H. Holleman, Tarzana, and Eugene V. Browne, Los Angeles, Calif., assignors to Northrop Aircraft, Inc., Hawthorne, Calif., a corporation of California Application December 1, 1951, Serial No. 259,334

22 Claims. (Cl. 244—7)

This invention relates to airplanes, and more particularly, to a new vertically landing (tail down), horizontally flying airplane, and a control system therefor.

It is known that prior attempts have been made to provide an aircraft which is capable of flight as outlined in the preceding paragraph. However, none as far as known have been completely successful, for various reasons. Some disadvantages of the heretofore proposed airplanes of this type are unsuitable and impractical landing gear means at the tail section, inadequate control systems, poor stability, the lack of means for effecting a satisfactory landing operation at and on a desired spot, and impractical propeller designs requiring special, unconventional, and costly manufacture.

The main objects of the present invention are to provide an airplane capable of vertical take-off and hovering, smooth transition from vertical to horizontal flight, high speed, return to vertical hovering attitude, and lowering to a good landing, wherein all the above listed disadvantages and problems are overcome, and especially having a simple yet novel control system to provide and maintain satisfactory control and all desired aspects of maneuverability during and throughout all phases and positions of flight.

Other objects and features of advantage will be noted or specifically pointed out in the detailed description of specific apparatus embodying this invention, which forms a major part of this specification.

In brief general terms, as to apparatus, our invention comprises a relatively short fuselage, counter-rotating dual propellers, a thin straight (unswept) high wing aft of the fuselage center, a ventral fin, control system components comprising full length elevon surfaces on the trailing edge of the wing, a rudder on the ventral fin trailing edge, and an all-movable horizontal tail control surface at the lower end of the ventral fin. A unique control arrangement permits elevator and aileron movements of the elevons, as controlled by a conventional stick or control wheel, while in the vertical and transition positions, and allows elimination of elevator movements of the elevons, as controlled by the stick, while in horizontal flight. The wing has several degrees of dihedral, and carries tip bodies having rearwardly extending shock strut means therein, and the ventral fin mounts a similar shock strut means, thus forming three widely spaced points for the landing support, together with a main landing shock absorber in the tail section of the fuselage.

The present invention will be more clearly understood by reference to the following detailed description of a preferred embodiment, together with the accompanying drawings, wherein:

Figures 1, 2 and 3 are plan, front end and left side views, respectively, of a preferred aircraft configuration embodying the present invention.

Figure 7 is a phantom perspective view diagrammatically showing the major components of the surface control system and showing the control surfaces as stippled areas.

Figure 8 is a plan view diagram of the rudder control system.

Figure 9 is a diagram showing the rudder control system viewed from the side as indicated by line 9—9 in Figure 8.

Figure 10 is a plan view diagram showing the right-hand elevon control system.

Figure 11 is a diagram showing the right-hand elevon connections viewed from the side as indicated by line 11—11 in Figure 10.

Figure 12 is a side view diagram showing the horizontal tail control system and control stick connections to the elevon control system.

Figure 13 is a diagram showing the control stick connections viewed from the rear as indicated by line 13—13 in Figure 12.

Figure 14 is an enlarged perspective diagram showing the control stick mechanism of Figures 12 and 13 as viewed from the top left rear.

Figure 15 is a partial cut-away plan view of the airplane, showing landing strut details with struts in the static position on a ground line.

Figure 4:
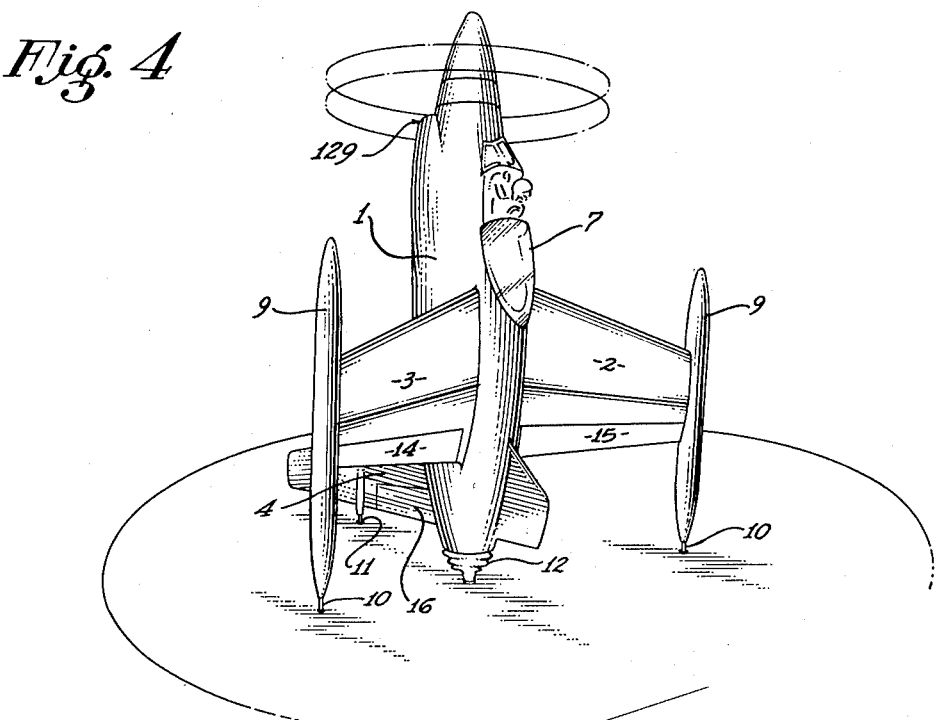
Figure 4 is a perspective view illustrating the same aircraft in its vertical resting position on the ground or a landing platform.

All directional references and locations specified in this description, and in the following claims, with respect to the airplane, i. e., downwardly, rearwardly, horizontal surfaces, etc., are made relative to an assumed horizontal position of the airplane, as in conventional flight.

Referring first to Figures 1, 2 and 3 to begin the description of detailed apparatus, the airplane of our invention comprises a fuselage 1, two main wing panels 2 and 3 intersecting the fuselage 1 near the top thereof, a ventral fin 4 extending vertically downwardly from the aft end of the fuselage, an all-movable horizontal tail surface 5 (hereinafter called elevator) mounted at the lower end of the ventral fin 4, and dual counter-rotating propellers 6. A pilot's cockpit with removable enclosure 7 is provided well forward of the wing panels 2 and 3 where the range of vision is exceptionaly large. Each wing panel has a dihedral angle of about 15° from the horizontal, and a wing tip pod 9 is mounted on the tip of each wing panel 2 and 3. The tip pods 9 are long and slender, and each carries a wing tip landing strut 10 projecting a short distance from the rear. These wing tip struts 10, in cooperation with a fin landing strut 11 extending aft from the ventral fin 4 and a collapsible tail cone 12 on the aft end of the fuselage 1, form the landing gear for this aircraft, and will be discussed in more detail later. The normal flight position of the tail cone 12 is shown in broken lines in Figures 1 and 3. The tip pods 9 may be used as fuel tanks, armament housings, or other desired use.

As also shown in Figures 1, 2 and 3, airplane attitude control means consist of a left- and a right-hand elevon surface 14 and 15 extending the full length of the wing trailing edge, a rudder 16 in the trailing edge of the ventral fin 4, and the elevator 5. The elevons 14 and 15 are operated by a conventional control stick, for example, and, by a mechanism to be subsequently described in detail, will function as both ailerons and elevators or as ailerons alone.

Figure 5:
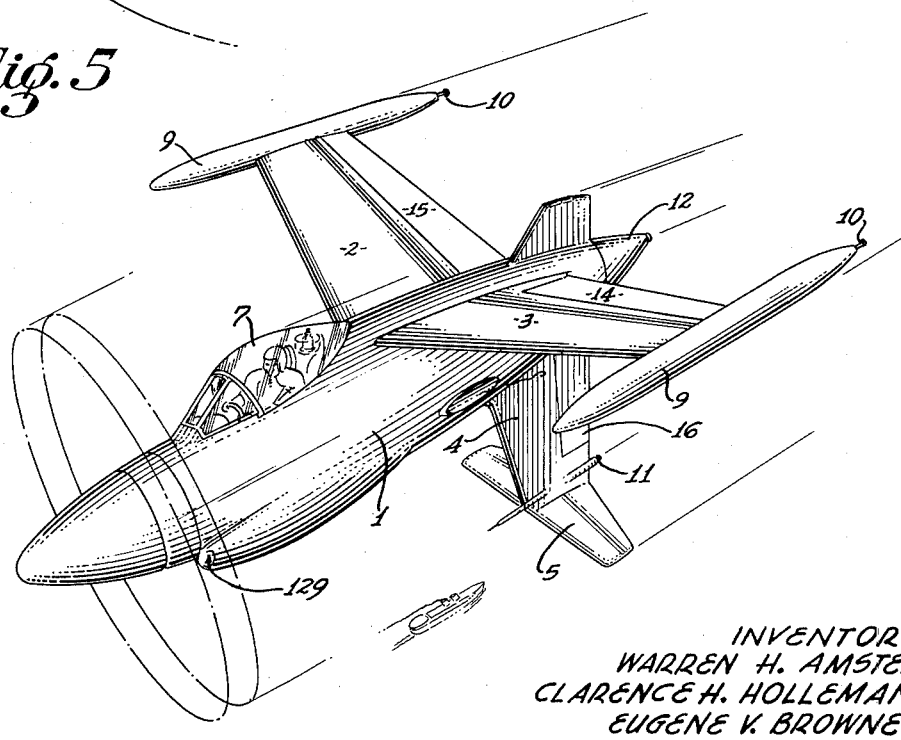
Figure 5 is a perspective view illustrating the aircraft in normal horizontal flight.

This airplane is designed to take-off vertically from a tail-down landing position as shown in Figure 4. After a desired sufficient altitude has been attained, it is inclined toward the horizontal and starts to pick up speed in this latter direction while still mostly "hanging" by the propellers. Finally, the airplane assumes a normal horizontal flight position as shown in Figure 5.

Figure 6:
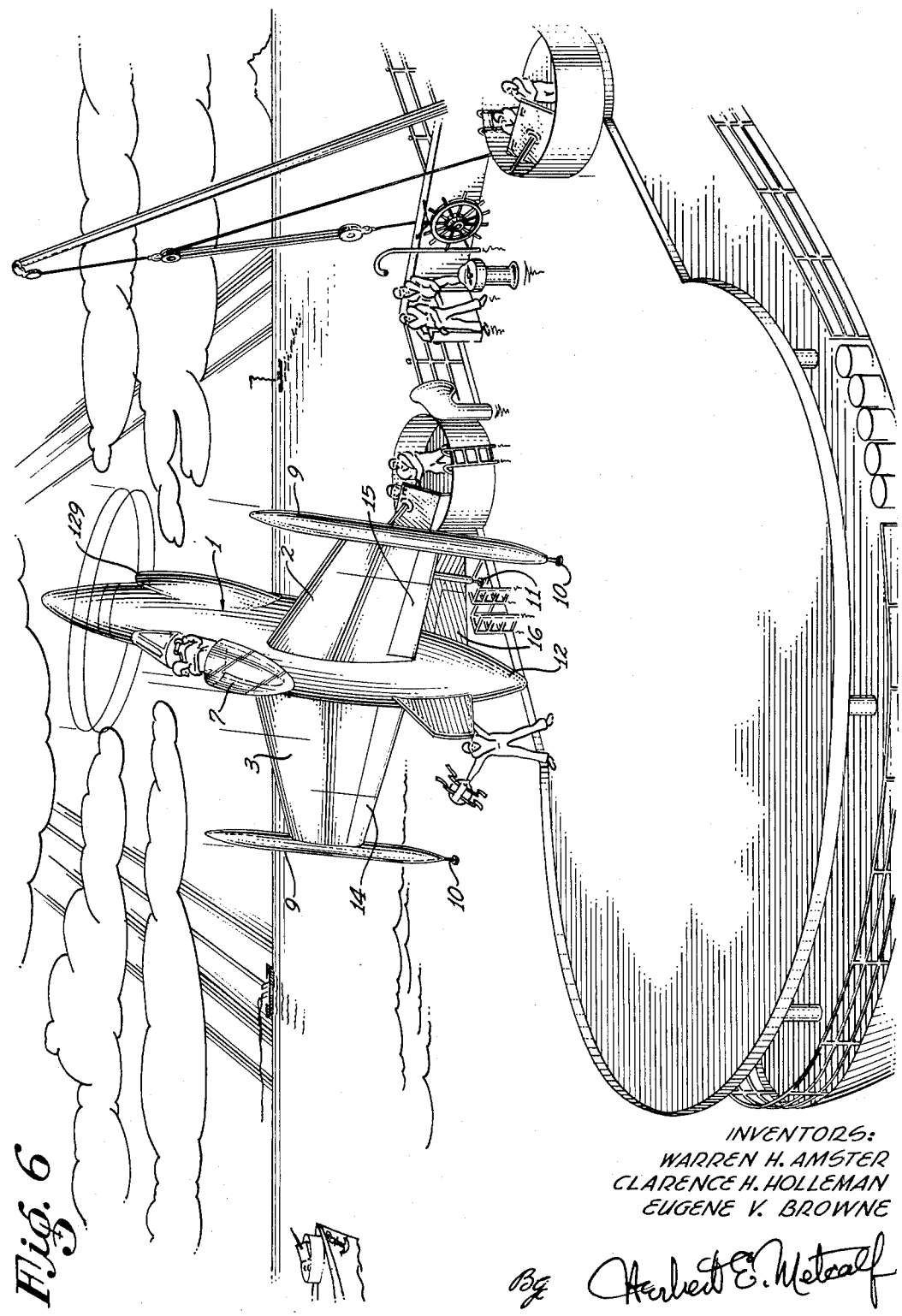
Figure 6 is a perspective view showing the aircraft in hovering position just above the take-off and landing deck of a vessel.

When ready to land, the pilot brings the airplane low over the desired landing spot, which may be any small platform (substantially level) on land or aboard a ship at sea. Then, as shown in Figure 6, the airplane is maneuvered into a vertical hovering position and lowered to the deck by correctly adjusting the thrust of the propellers. It may be guided in any direction while hovering, so that a good landing is readily accomplished, even with appreciable relative wind velocity and pitching of the ship on the water. Stability is maintained at all times.

The above briefly-described operation is made possible by the provisions of this invention, including the particular aerodynamic configuration, control system, and landing means, all of which cooperate together, and each will now be taken up individually.

It has been found that a swept back wing becomes highly unstable at low speed and high engine power. Since these two conditions occur when the present airplane is in the vertical hovering attitude and in the transition range between vertical and horizontal flight, a thin straight wing was selected in preference to a swept-back or delta planform. Another problem arose when it was found that a conventionally located horizontal tail would cause erratic stability and large trim shifts. In addition, the strong propeller slip stream would greatly increase buffeting and shaking, if the usual tail were incorporated. Therefore, we have provided the present all-movable elevator 5 at the lower end of the ventral fin 4, where it is away from both wing wake and propeller slip stream. The ventral fin itself provides directional stability and also serves as a necessary landing support. Since the elevator 5 does not afford longitudinal control during hovering flight, the elevons 14 and 15 are movable as elevators as well as ailerons during this flight stage, and an adequate elevon control area is provided by making the elevons essentially as long as the wing panels 2 and 3.

The over-all control system is shown in Figure 7. Full-power controls are used throughout, since such a system offers reliable operation and independence from reactions due to wide variations of control surface forces especially prevalent in a high speed airplane of this type.

Beginning with the rudder system, and referring also to Figures 8 and 9, this system comprises conventional pilot's rudder pedals 17, connected by a pedal linkage 18 to move rudder cables 19 and a rudder operating crank 20. Two hydraulic rudder actuating cylinders 21, operating in a parallel linkage, have their closed ends connected to a dual rudder horn 22 attached to the rudder 16. Each cylinder assembly includes a rudder piston rod 24 connected to the customary piston 25 operating in its respective cylinder, and both piston rods 24 are pivotally anchored to the airplane structure 26. Each cylinder is also provided with a rudder operating valve 27 attached directly to its respective cylinder housing, and two rudder valve control rods 29 operate in and out of the valves 27 as simultaneously controlled by a valve rod yoke 30.

The rod yoke 30 is pivotally connected to each of said rudder valve control rods 29 substantially in line therewith and forms an adaptor for one end of an electrical autopilot rudder servo actuator 31 which is pivotally connected at its other end to one side of the rubber operating crank 20. When the rudder servo actuator 31 is inactive, it serves as an ordinary solid control rod and moves as a whole when the operating crank 20 rotates. Operation of the rudder servo actuator will be referred to later.

Rudder operating valves 27 are each provided with hydraulic line connections 32 to the supply and return lines of two separate airplane hydraulic power systems (not shown), one complete system for each rudder valve and actuating cylinder. Both hydraulic power systems normally are in operation, but in the case of failure of one, the second alone can operate the rudder.

It is thus seen that a full-power rudder control system is provided. When one of the pilot's rudder pedals 17 is depressed, for example, the rudder cables 19 will rotate the operating crank 20 and move the valve control rods 29 relative to the operating valves 27. Hydraulic fluid is thereby caused to operate the actuating cylinders 21 and turn the rudder 16. With the valves 27 attached to the movable cylinders 21, and correct connection of hydraulic supply and return lines, the actuating cylinders will move in the same direction in which the valve control rods 29 were displaced, thus returning the valves to neutral and stopping rudder movement at a position dictated by the final rudder pedal position. All surface forces are resisted entirely by the hydraulic cylinder components, and the pilot, therefore, feels no pedal forces as a result of aerodynamic reactions. To provide the desired feed-back forces to the pilot, a two-way rudder centering spring assembly 34 is connected between the rudder operating crank 20 and airplane structure 26. With this connection placed in the system, the centering spring assembly 34 will center the rudder if any component of the control system from the operating crank 20 to the rudder pedals 17 is severed.

Referring now to the elevon controls (Figures 7, 10, and 11), the right-hand elevon 15 is provided with dual elevon actuating cylinders 35 and elevon horns 36 similarly to the rudder system. Elevon piston rods 37 are pivotally connected to the airplane structure 26, and elevon operating valves 39 have jointed outboard and inboard valve control rods 40 and 41, respectively. An outboard bell crank 42 is rotatably mounted in a structural bracket 44 and has two long arms 45 and one short arm 46. The short arm 46 is pivotally connected to the outboard valve control rod 40. An inboard bell crank 47 is similarly provided, to be freely rotatable about a fixed inboard bell crank axis 49. The short arm of the inboard bell crank 47 is pivotally connected to the inboard valve control rod 41. Interconnection cables 50 between the respective long arms of the bell cranks 42 and 47 provide simultaneous and parallel operation of the elevon actuating cylinders 35 connected to the right-hand elevon 15.

Two sets of elevon bell crank pulleys 51 are rotatably mounted on the long arms of the inboard bell crank 47. A cable drum 52 is also freely rotatable on the inboard bell crank axis 49. An autopilot elevon servo actuator 54 has one end pivotally attached to structure 26 and the other end pivotally connected at 90° to a drum lever arm 55 secured integrally with the cable drum 52. A dual elevon cable system comprising elevon "up" cables 56 and elevon "down" cables 57 is connected at the inboard end of the elevon 15, these cables passing around the bell crank pulleys 51 and being fastened to opposite sides of the cable drum 52 in grooves therein.

Thus, when the elevon cables 56 and 57 are operated by the pilot's manual controls, both bell cranks 42 and 47 will be rotated, since the cable ends at the cable drum 52 are being held stationary, and the elevon actuating cylinders 35 are controlled exactly like the rudder actuating system. When the elevon servo actuator 54 is operated by power applied thereto, the cable drum 52 is rotated, and, when the elevon cables 56 and 57 are being held stationary at the pilot's end, the bell cranks 42 and 47 are thereby rotated to govern elevon movement. Therefore, the elevon 15 may be operated by two independent input control systems, either separately or simultaneously, but by the same full-power hydraulic actuating means. The dual input connections disclosed herein for the elevon use a method and means similar to that shown, described and claimed in a copending application by Oates et al., Serial No. 195,282, filed November 13, 1950, now Patent No. 2,684,216.

The left-hand elevon 14 is provided with a control installation operating in the identical manner as does that shown in the right-hand section of Figure 10 and Figure 11, and will not be described in detail.

A pilot's control stick 60, shown in Figures 7, 12, 13 and 14, is connected to control movements of the elevons 14 and 15 in a novel manner as will now be described. Referring first to Figures 12 and 14, which are merely working diagrams illustrating one embodiment of the invention, the stick 60 is pivotally connected at its lower end to a stick housing 61. An adjustable linkage 62 between the stick 60 and housing 61, when locked at a given length, connects the housing 61 to move with the stick 60. Near the housing lower end, a support fork 64 is pivotally connected thereto along a laterally extending elevator pivot axis 65. The fork 64 is carried by a longitudinally extending hub 66 rotatable in a hub support 67 about an aileron pivot axis 69. The hub support 67 is fixed to the airplane structure 26, thus forming the main support of the stick assembly. Obviously, the control stick 60 may be rotated fore-and-aft about the elevator pivot axis 65 for longitudinal control, and laterally about the aileron pivot axis 69 for lateral control.

Above the pivot axes, a pair of rearwardly extending housing legs 70 carry a stick yoke 71 rotatable about a yoke bolt 72 mounted laterally through the legs 70. The stick yoke 71 widens at the bottom to mount a universal motion fitting 74 at each lower corner. A pair of side links 75 and 76 (also shown in Figure 13) are connected each to one universal fitting 74 and to a pair of elevon control cranks 77 and 78, respectively, by similar universal fittings 74a. The control cranks 77 and 78 are pivotally mounted forward of the fittings 74a in a pair of crank brackets 79 fixed to structure 26, so that the control cranks rotate in a vertical plane, only, with respect to a level airplane.

Below the crank brackets 79, each control crank 77 and 78 is connected to a forwardly projecting spring-loaded push-pull rod 80 and 81, respectively. Normally, the push-pull rods 80 and 81 act as solid connecting rods, and may be considered as such for the time being. The forward end of the left-hand push-pull rod 80 is rotatably connected to a left-hand lever 82 fixed to a vertical torque shaft 84 on the longitudinal center line of the stick assembly, which, in this case, is also the airplane center line. Similarly, the right-hand push-pull rod 81 connects to a right-hand lever 85 fixed to a torque tube 86 concentrically mounted around the torque shaft 84.

Both torque shaft 84 and tube 86 are rotatably supported in a pressure seal and floor bearing 87. Below the floor level, the torque tube 86 carries a double-ended right-hand elevon control arm 89, and below that, the torque shaft 84 carries a left-hand elevon control arm 90. The right-hand elevon "up" control cables 56 are connected to one end of the right-hand control arm 89, and the right-hand elevon "down" cables 57 are connected to the other end. Similarly, a dual set of left-hand elevon cables 91 is connected to the left-hand control arm 90.

Although the stick yoke 71 has a rotatable connection with the stick housing 61, it is adjustable to two main fixed positions with respect to the housing 61 by means of a hand crank 92. The hand crank 92 rotates a threaded member 94 through a housing projection 95, and in cooperation with a universal joint 96 and rotary slip connection with a terminal fitting 97 pivotally connected to a lug 99 on the stick yoke 71, thus operates to rotate the stick yoke 71 about its yoke bolt 72. The distance from the axis of the yoke bolt 72 to the elevator pivot axis 65 is equal to the distance from the yoke bolt 72 to a lateral line connecting the lower ends of the two side links 75 and 76 at the lower universal fittings 74. Therefore, when the hand crank 92 is screwed to raise yoke lug 99, the yoke 71 may be rotated relative to the stick housing 61 to place the lower universal fittings 74 exactly on the elevator pivot axis 65.

In the position shown in Figure 14, it can be seen when the control stick 60 is rotated aft, for example, the yoke 71 being held fixed with the housing 61 by means of the threaded member 94, that the lower connections of the yoke 71 will move in an arc about the elevator pivot axis 65 and act to pull the side links 75 and 76 both downwardly. The push-pull rods 80 and 81 are thereby both moved forwardly an equal distance. This causes tensioning of the right-hand elevon "up" cables 56, and from Figure 10 it will be seen that the result is an upward movement of the right-hand elevon 15. The left-hand elevon 14 similarly is raised by the action of the left-hand elevon cables 91 extending from the left-hand elevon control arm 90. Likewise, a forward control stick movement lowers both elevons 14 and 15, to nose the airplane down.

Also from the position shown in Figure 14, it can be seen that a sideways rotation of the control stick 60 about the aileron pivot axis 69, to the left, for example, will cause raising of the right-hand side link 76 and lowering of the left-hand side link 75, to move the elevons 14 and 15 in opposite directions simultaneously for roll control.

If, however, the hand crank 92 be rotated to bring the lower side link and yoke connections into coincidence with the elevator pivot axis 65, any fore-and-aft movement of the control stick 60 will have no motive effect on the side links 75 and 76, thus eliminating the elevator action of the elevons 14 and 15. Aileron action of the elevons still continues, however, since sideways stick movement operates at all times to raise one side link and lower the other.

It is preferred to have two specifically designated positions for the stick yoke 71, one known as the "zero elevator" position and the other known as the "full elevator" position.

For aileron centering forces, a two-way aileron centering spring assembly 100 (Figure 13) is laterally positioned in the airplane, pivotally fastened at one end to structure 26, and at the other end to a hub lever 101 secured to the hub 66.

The elevator control system is illustrated in Figure 12. Here, a lower extension 102 of the stick housing 61 pivotally connects to a relatively long elevator control rod 104 leading aft to connect with an elevator control crank 105 (Figure 10) rotatably mounted in a fixed crank bracket 106. Each end of the elevator control rod 104 is equipped with universal or self-aligning bearings so that the lateral stick movement during aileron control will not bind or strain the rod end connections. Elevator control cables 107 connected to opposite ends of the elevator control crank 105 are routed to opposite respective ends of an elevator operating crank 109 pivotally installed in the lower portion of the fuselage 1 above the ventral fin 4.

Elevator actuation is accomplished in the same manner and with power-operated components equivalent to those for the elevons 14 and 15 and rudder 16, including an elevator actuating cylinder 110, elevator operating valve 111 with valve control rod 112, and elevator servo actuator 114. An elevator centering spring 115 similar in function and position to the rudder centering spring 34 is also incorporated, together with the necessary surface moving mechanism 116 from the actuating cylinder 110 to the elevator 5.

In addition to the elevator centering spring 115, which provides a constant stick force relation versus stick displacement in the elevator moving direction, a separate elevator force producer is preferably employed to vary the stick forces with aerodyamic conditions. Such a force producer is shown herein as comprising an aerodynamic force bellows 117 (Figures 10 and 12) having a bellows force shaft 119 connected to the elevator control crank 105. When in neutral, the force connection line from the bellows 117 to the control crank 105 passes through the crank center of rotation, so that centering forces are obtained. These synthetic force producers form no part of the present invention and are well known in the art.

From the foregoing control system description, it will be noted that the elevator 5 is always connected for movement whenever the control stick 60 is moved in fore-and-aft directions. During vertical and hovering flight, the elevator 5 is not effective for longitudinal control however, as mentioned previously. Therefore, during airplane take-off, and transition to horizontal flight, the stick yoke 71 will be maintained in the "full elevator" position so that the elevons 14 and 15 can move in the same direction simultaneously for elevator action and control. Upon reaching normal horizontal flight, the hand crank 92 will be turned by the pilot to the "zero elevator" position, where the elevator 5 is the sole longitudinal control surface. Then, before going into the vertical hovering position for a landing, the hand crank 92 and stick yoke 71 will be returned to "full elevator."

It is important to note that normal conventional control stick operation by the pilot is adhered to at all times, regardless of system control changes by the hand crank 92. It will also be understood that the hand crank 92 may be replaced by automatic power means under control of the pilot.

The rudder servo actuator 31, elevon servo actuators 54 and elevator servo actuator 114, each acting independently in series with the pilot's manual controls for its respective surface, may function as autopilot servos, trim actuators, and any other control purposes which are desired. The full-span elevons 14 and 15 can be used as high lift wing flaps, in horizontal flight, preferably by energizing the elevon servo actuators 54 to deflect both elevons downwardly simultaneously, as desired. They can thus be used to increase the lift during climbs, and to decrease the lift and drag during high speed horizontal flight, the amount of these several factors depending upon the aerodynamic characteristics of the particular airplane involved.

The spring-loaded elevon push-pull rods 80 and 81 are preloaded to act as rigid connecting rods up to a predetermined value beyond the normal system operating loads imposed upon them. Above the preload force, they will stretch or compress, to prevent damage to system components. This precaution is highly desirable since the mechanical advantage of any stick forces in the fore-and-aft direction is exceptionally high (approaching infinity) when the stick yoke 71 is near the "zero elevator" position. When the hydraulic power is off, such as when the airplane is parked, carless or inadvertent handling of the control stick could therefore result in easily overloading any part of the elevon control system between the control stick 60 and the elevon actuating cylinders 35.

The landing strut arrangement is shown in Figure 15. The wing tip struts 10 and the fin landing strut 11 each comprise a piston and cylinder assembly 120 of any suitable type, preferably small combination compressed air and hydraulic shock struts with an enlarged bumper 121 on the external end of the strut. The stroke of these three struts is about 6 inches.

The collapsible tail cone 12 covers the major landing shock absorber, which normally extends substantially farther to the rear than the other landing struts. It is made of a flexible material which completes the smooth contour of the fuselage tip when extended, and folds up when the airplane lands, as shown in Figure 4. The tail cone strut installation comprises a plunger 122 and a casing 124 attached to the airplane structure 26, similar in type to the other three struts, but having a total stroke of about 48 inches. When the airplane is in the parked position, the plunger 122 may be conveniently locked in a retracted position above the ground level, for ease of moving the airplane on three dollies under the wing tip struts 10 and fin strut 11.

Thus, three wide-spread landing support points are provided, without the necessity for separate installations usable for landing purposes only. A relatively large wing dihedral angle makes the possibility of tip-over more remote. As mentioned before, the airplane is capable of successful landings on a small deck of a vessel, for example, even under fairly rough weather conditions. It can be hovered over the landing spot and set down during a 35 knot relative wind. This is made possible by control movements of the rudder 16 to move the airplane sideways while hovering, and of the elevons 14 and 15 together in the same direction to move the airplane along at 90° to sideways motion while hovering. To then complete a landing under relative wind conditions, the tail is "tucked under" and the engines simultaneously shut down.

Figure 17:
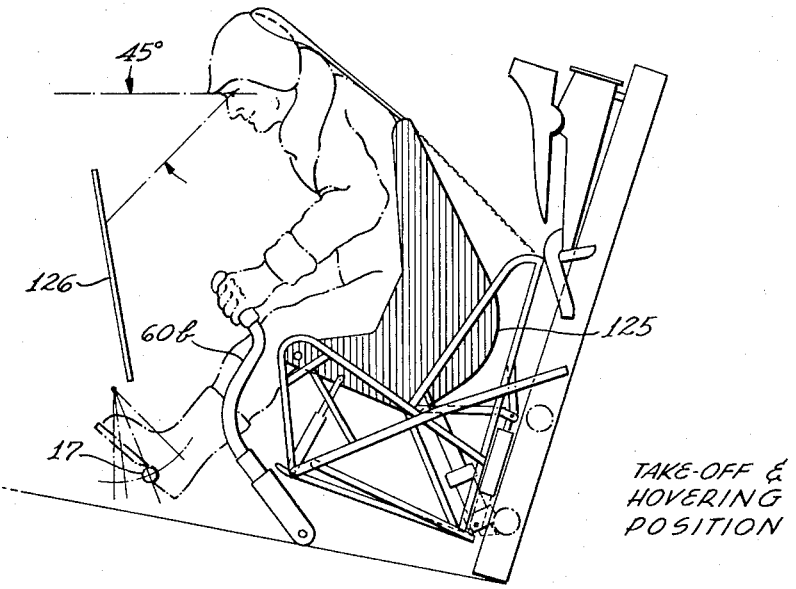
Figure 17 is a horizontal side view of the same pilot's seat installation, showing the seat rotated as it would be in the take-off, hovering and landing position.
Figure 16:
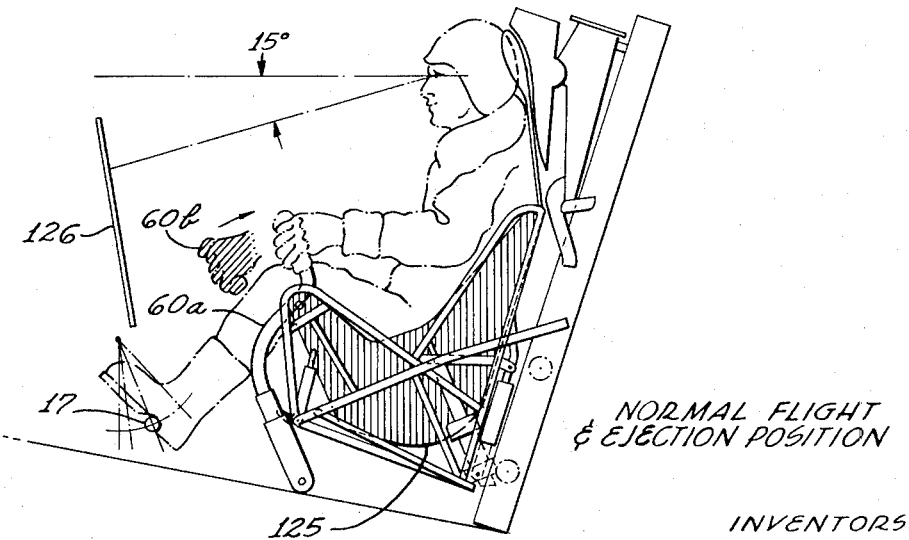
Figure 16 is a horizontal side view of a preferred pilot's seat installation in normal flight and ejection position.

As shown in Figures 16 and 17, the pilot is provided with an ejection type seat 125 having two positions of rotation about a lateral axis. Figure 16 shows the seat in the position used for normal horizontal flight and ejection, if necessary. Figure 17 shows the seat rotated 45° to the other position used during take-off and hovering. A line representing an instrument panel 126 shows its preferred location and angles of pilot sight line in viewing a certain point on the panel.

The positions of the control stick in Figures 16 and 17 are both neutral positions. Normal position 60a shows the stick position when the adjustable linkage 62 (Figures 12 and 14) is in its shortest position, and "vertical" position 60b shows the stick position when the adjustable linkage 62 is in its longest position. This stick adjustment provision gives the pilot a natural stick neutral position in both seat positions without any change in the actual control mechanisms. Of course, the adjustable linkage 62 may comprise any kind of extensible means lockable in at least two different positions, such as including a power-driven actuator, for example.

As also illustrated in Figures 16 and 17, the rudder pedals 17 remain connected in the same position for both positions of the pilot's seat 125. Adequate control by the pilot's legs is obtained without adjusting the rudder pedals 17 to new neutral positions.

With regard to power plant, the airplane of the present invention preferably incorporates a turbo-prop gas turbine engine having two power units 127 installed near the lower side of the fuselage 1, one on each side of the airplane center line, to the rear of engine air intakes 129. A two-speed reduction gear in a gear box 130 is provided between the power units and propellers, along with clutching means in the gear reduction unit for operating one or both power units to drive the propellers. The propellers 6 are not helicopter blades but conventional aircraft type propellers, utilizing a blade angle control system to render them known as "constant speed" propellers.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is therefore claimed in any of its forms or modifications within the legitimate and valid scope of the appended claims.

What is claimed is:

1. A vertically rising airplane comprising a fuselage, a high main wing attached to said fuselage and having a relatively high dihedral angle, a ventral fin extending perpendicularly downwardly under the rear of said fuselage, a horizontal tail plane at the lower end of said ventral fin, and landing strut means on said airplane extending to the rear for landing support in a tail-down position.

2. An airplane in accordance with claim 1 wherein said wing is essentially straight in planform, and including an elongated fore-and-aft pod member at each wing tip, and wherein said landing strut means comprises a wing tip strut in the aft end of each of said pod members, a fin strut near the lower end of said ventral fin, and a tail cone strut in the aft section of said fuselage.

3. An airplane in accordance with claim 1 including a pair of hinged elevon surfaces in the trailing edge of said wing, one of said pair on each side of said fuselage, a rudder in the trailing edge of said ventral fin, and wherein said horizontal tail plane is movable as an elevator surface.

4. An airplane in accordance with claim 1 including counter-rotating propellers at the front of said fuselage, a pair of hinged elevons in the trailing edge of said wing, one of said pair on each side of said fuselage and extending substantially the full length of said trailing edge, a rudder in the trailing edge of said ventral fin, wherein said horizontal tail plane is movable as a longitudinal control surface and is outside of the slip stream of said propellers, and said wing being situated so that said elevons function as longitudinal control surfaces when moved in the same direction simultaneously.

5. An airplane in accordance with claim 1 including an elongated fore-and-aft pod member at each wing tip, and wherein said landing strut means includes a wing tip shock strut assembly fixed in the aft end of each of said pod members, a fin shock strut assembly fixed near the lower aft edge of said ventral fin, a tail shock strut in the aft section of said fuselage, and a flexible collapsible cover member connected at the forward side to a rigid section of said fuselage and connected at the aft side to said tail shock strut near the extremity thereof, said flexible cover member completing the smooth exterior contour of said fuselage aft section when said tail shock strut is in the normal extended position, said tail shock strut having a stroke several times the strokes of said wing tip struts and said fin struts, and normally extending farther to the rear than the latter three struts.

6. In an airplane of the type described, a wing, a pair of elevon surfaces hinged to said wing, one of said pair on each side of said airplane, a ventral fin extending downwardly under the rear of said airplane, a rudder hinged to said ventral fin, a horizontal tail control surface at the lower end of said ventral fin movable in longitudinal control directions, means for moving said rudder for directional control, means for moving said elevons in opposite directions simultaneously for roll control, means for simultaneously moving said elevons and said horizontal tail surface in the same direction for longitudinal control, and control means for eliminating, at will, longitudinal control movements of said elevons only, said control means being arranged to reinstate, at will, longitudinal control movements of said elevons along with said horizontal tail surface.

7. Apparatus in accordance with claim 6 wherein said airplane has counter-rotating propellers to move said airplane forwardly, and wherein said horizontal tail surface lies outside the circumference of the rotating paths of said propellers projected in a fore-and-aft direction.

8. Apparatus in accordance with claim 6 wherein said wing is essentially straight in planform and has a relatively high dihedral angle, and including an elongated fore-and-aft pod member at each wing tip, and landing strut means on said airplane extending to the rear for landing support in a tail-down position, said landing strut means including a wing tip shock strut in the aft end of each of said pod members and a fin shock strut near the lower aft edge of said ventral fin.

9. In an airplane of the type described, a wing, a pair of elevon surfaces hinged to said wing, one of said pair on each side of said airplane, a ventral fin extending downwardly under the rear of said airplane, a horizontal tail surface at the lower end of said ventral fin movable in longitudinal control directions, a pilot's control member pivotal about two axes, aileron control means connected between said control member and said elevons for moving said elevons in opposite directions simultaneously for roll control, when said control member is moved in a lateral controlling direction about one of said axes, elevator control means connected between said control member and said horizontal tail surface for longitudinal control, elevon control means connected between said control member and said elevons for moving said elevons in the same direction simultaneously for longitudinal control, said elevon control means and said elevator control means being simultaneously and additively responsive to elevation controlling movements of said control member about the second control axis, and pilot-operated means connected to said elevon control means to eliminate the longitudinal control movements of said elevons with movement of said control member.

10. Apparatus in accordance with claim 9 wherein said elevon control means includes a yoke member pivotally connected to said pilot's control member about a yoke axis parallel to one of said control member axes, said yoke member having two corner connection points located so that a line through said points is parallel to said yoke axis and so that said line and said parallel control member axis are equidistant from said yoke axis, a left-hand elevon link pivotally connected to one of said connection points, a right-hand elevon link pivotally connected to the other connection point, and elevon actuating means connected between each of said links and its respective elevon, and wherein said pilot-operated means comprises an adjustable linkage between said control member and said yoke member for rotating said connection points into and out of coincidence with said parallel control member axis.

11. Apparatus in accordance with claim 10 wherein said yoke member and said adjustable linkage have a first operating position relative to said control member where said connection points are coincident with said parallel control member axis, and a second operating position where said connection points are at a given maximum distance from said parallel axis, said elevon links are push-pull members which are positioned at substantially 90° to the plane containing said parallel control member axis and said connection point line when said yoke is in said second position and said pilot's control member is in a neutral position where said elevon surfaces and said horizontal tail surface normally are not deflected from straight and level flight position.

12. Apparatus in accordance with claim 9 wherein said elevon control means comprises an elevon control element driven by said pilot's control member and rotatable in longitudinal controlling directions about an element axis, two-position crank means pivotally connected to said element and having connection points thereon rotatable in an arc about said element axis with said element when said crank means is in one of its two positions, said connection points being rotatable exactly on said element axis when said crank means is in the second of said two positions, and elevon actuating means connected between said connection points on said crank means and said elevons; and wherein said pilot-operated means comprises adjustable means connected between said element and said crank means for moving said crank means between said two positions relative to said element.

13. An airplane in accordance with claim 1 including a pilot's control member connected to a control system for controlling movements of said airplane, a pilot's seat pivoted to have two operating positions relative to said airplane, one for horizontal flight and one for vertical and hovering flight, and adjustable connecting means between said control member and said control system arranged to provide two positions of said control member relative to said control system, one of said member positions being convenient to the pilot in one of said seat positions, and the other member position being convenient to the pilot in the other seat position.

14. A control system for an airplane adapted to take-off and land vertically along a line of thrust therein and fly horizontally along said thrust line, said control system comprising a first control surface movable in a given direction relative to said airplane, a second control surface movable in the same relative direction, means for simultaneously moving said first and second control surfaces in the same direction, and controllable means for eliminating, at will, movements of said second control surface with movements of said first control surface, said controllable means being arranged to reinstate, at will, said second control surface movement with said first control surface movement.

15. A control system for an airplane adapted to take-off and land vertically along a line of thrust therein and fly horizontally along said thrust line, said control system comprising a first control surface movable in a given direction relative to said airplane, a second control surface movable in the same relative direction, means for simultaneously moving said first and second control surfaces in the same direction, and controllable means for maintaining, at will said second control surface in a neutral position with respect to movements of said first control surface.

16. A control system for an airplane adapted to take-off and land vertically along a line of thrust therein and fly horizontally along said thrust line, said control system comprising a first control surface movable for attitude control about a lateral axis perpendicular to said line of thrust, a second control surface also movable for the same attitude control, a pilot's control member, first control means connected between said control member and said first control surface, second control means connected between said control member and said second control surface, said first and second control means and surfaces being simultaneously and additively responsive to movements of said control member in a given direction, and pilot-operated means connected to said second control means to eliminate said attitude control movements of said second control surface with movement of said pilot's control member in said given direction.

17. Apparatus in accordance with claim 16 wherein said second control means comprises a rotatable element driven by said pilot's control member and rotatable in said same attitude controlling directions about an element axis, two-position crank means pivotally connected to said element and having connection points thereon rotatable in an arc about said element axis with said element when said crank means is in one of its two positions, said connection points being rotatable exactly on said element axis when said crank means is in the second of said two positions, and second-surface actuating means connected between said connection points on said crank means and said second surface, and wherein said pilot-operated means comprises adjustable means connected between said element and said crank means for moving said crank means between said two positions relative to said element.

18. A control system for an airplane adapted to take off and land vertically along a line of thrust therein and to fly horizontally along said thrust line, and said airplane having a wing and a tail section, wherein said control system comprises a horizontal control surface at said tail section movable for longitudinal control of said airplane, a pair of wing control surfaces hinged to said wing, one of said pair on each side of said airplane, said wing control surfaces being also movable for said longitudinal control, a pilot's control member, first control means connected between said control member and said horizontal tail surface for longitudinal control, second control means connected between said control member and said wing control surfaces for moving said wing surfaces in the same direction simultaneously for said longitudinal control, said first and second control means being simultaneously and additively responsive to movements of said control member in a given direction, and pilot-operated means connected to said second control means to eliminate said longitudinal control movements of said wing control surfaces with movement of said pilot's control member in said given direction.

19. Apparatus in accordance with claim 18 wherein said second control means comprises a rotatable element driven by said pilot's control member in said same attitude controlling directions about an element axis, a yoke member pivotally connected to said pilot's control member about a yoke axis parallel to said element axis, said yoke member having two corner connection points located so that a line through said points is parallel to said yoke axis and so that said line and said element axis are equidistant from said yoke axis, a left-hand wing control surface link pivotally connected to one of said connection points, a right-hand wing surface link pivotally connected to the other connection point, and wing surface actuating means connected between each of said links and its corresponding wing control surface, and wherein said pilot-operated means comprises an adjustable linkage between said rotatable element and said yoke member for rotating said connection points into and out of coincidence with said element axis.

20. A vertically rising airplane comprising a fuselage, a wing attached to said fuselage, a tail fin attached to said fuselage, and landing strut means on the rear tips of said wing and tail fin for landing support in a tail-down position, said wing having a substantial elevation angle between the two halves thereof at their intersection with the fuselage, and said tail fin extending from said fuselage in the direction to bisect the reflex angle formed by said wing as viewed along the longitudinal axis of said airplane, whereby three substantially evenly spaced landing strut points are provided for stability.

21. A vertically rising airplane comprising a fuselage, a wing attached to said fuselage and having a relatively high dihedral angle, said wing being essentially straight in planform, an elongated fore-and-aft pod member at each wing tip, a ventral fin extending downwardly under the rear of said fuselage, and landing strut means including a wing tip strut in the aft end of each of said pod members and rearwardly extending fin strut means attached near the lower extremity of said ventral fin.

22. A vertically rising airplane comprising a fuselage, a wing attached to said fuselage and having a relatively high dihedral angle, a ventral fin extending downwardly under the rear of said fuselage, a horizontal tail plane attached to said ventral fin, and landing strut means on said airplane extending to the rear for landing support in a tail-down position.

References Cited in the file of this patent

UNITED STATES PATENTS

| | | |
|---|---|---|
| 2,308,802 | Barling | Jan. 19, 1943 |
| 2,382,460 | Young | Aug. 14, 1945 |

FOREIGN PATENTS

| | | |
|---|---|---|
| 568,548 | Great Britain | Apr. 10, 1945 |
| 728,256 | Germany | Nov. 24, 1942 |